Patented Jan. 10, 1950

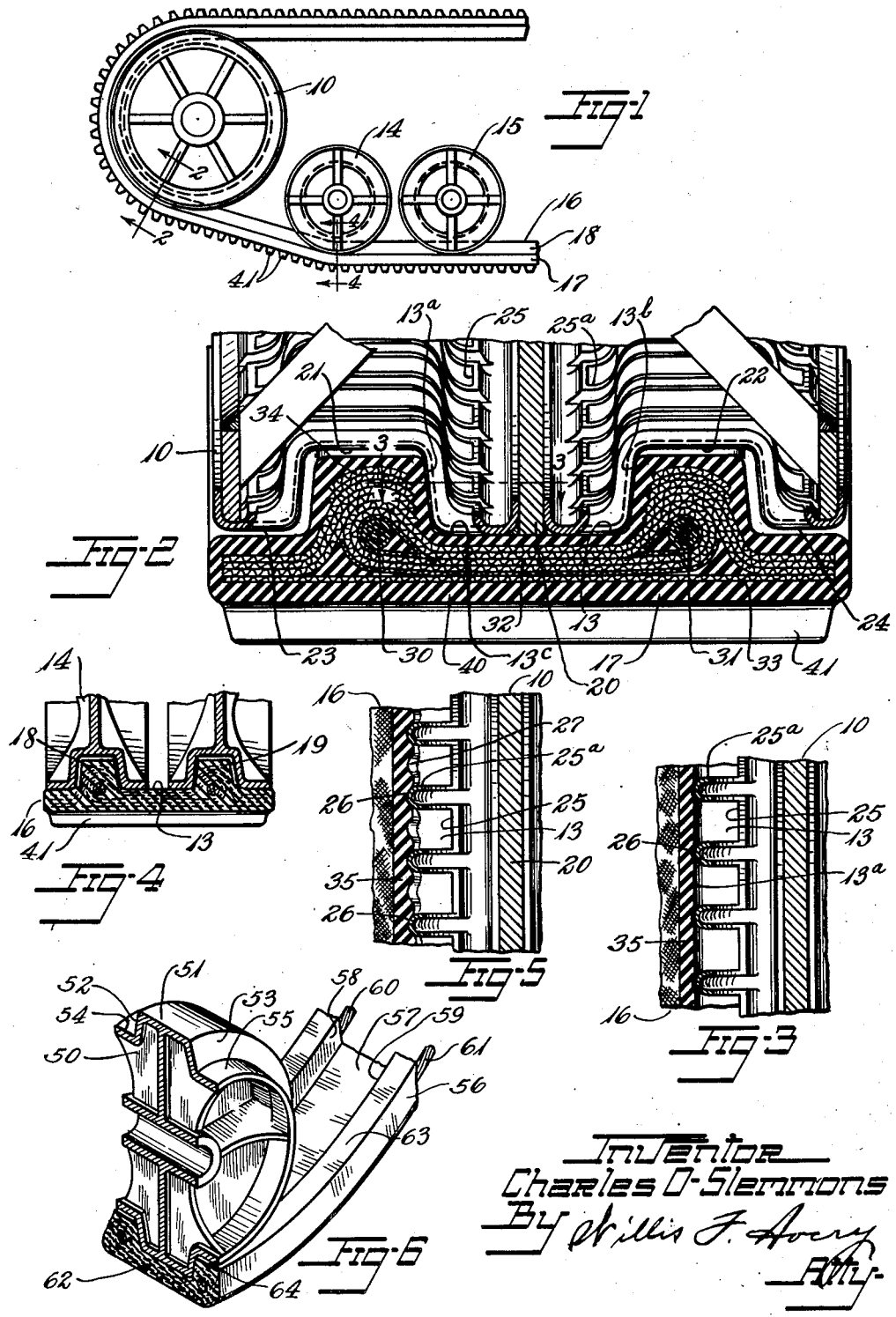

2,494,065

UNITED STATES PATENT OFFICE 2,494,065

BAND POWER TRANSMISSION

Charles O. Slemmons, Akron, Ohio, assignor to The B. F. Goodrich Company, New York, N. Y., a corporation of New York Application June 29, 1944, Serial No 542,736

17 Claims. (Cl. 305—10)

This invention relates to band power transmission, including endless tracks, belts and the like and to pulley and other wheel assemblies therefor. The invention is useful especially in track assemblies for self-laying track type vehicles, although in some of its phases it is of benefit in belts for power transmission and other purposes.

Objects of the invention are to provide an improved friction drive, to provide a high degree of traction between the band and the wheel with minimum wedging action at the positions of initial and final contact of the band with the wheel, to reduce or eliminate scuffing of the band on the wheel, to provide lateral gripping of an intermediate portion of the wheel by side portions of the band, and to provide smooth and effective operation.

Further objects are to provide an effective drive and band therefor in which the traction is provided by a circumferential ridge on the wheel riding in a valley in the band, and to provide in such a band the advantages of endless grommet reinforcement.

These and other objects will appear from the following description and the accompanying drawings.

Of the drawings,

Fig. 1 is a side elevation of a band track assembly constructed in accordance with and embodying the invention, parts being broken away, Fig. 2 is a cross-sectional view taken on line 2—2 of Fig. 1, parts being broken away, Fig. 3 is a sectional view taken on line 3—3 of Fig. 2, parts being broken away, Fig. 4 is a sectional view taken on line 4—4 of Fig. 1, parts being broken away, Fig. 5 is a view similar to Fig. 3, showing a modified construction, and Fig. 6 is a perspective view of a power transmission belt assembly embodying the invention, parts being broken away.

Referring to the drawings, the numeral 10 designates a drive wheel of a track type vehicle provided also with bogie wheels 14, 15. A band track 16 extends about all the wheels and contacts with the ground. The track has a relatively flat body portion 17 on the inner or wheel face of which are a plurality of deep parallel ridges or ribs 18, 19 defining therebetween a continuous valley 13 having steeply inclined sides 13a, 13b and a flat bottom 13c. The drive wheel is formed with a central, circumferential, outwardly directed portion 20 adapted to engage the bottom 13c of the band and steeply inclined lateral margins adapted to engage frictionally the inwardly facing sides 13a, 13b of the belt ribs. At each side of the peripheral portion 20 the wheel rim extends axially and then radially to define clearance grooves 21, 22 and then axially again to provide cylindrical portions 23, 24 which also clear the band but are of advantage in providing additional support to the track momentarily when objects strike the track at a position about the wheel in which case the track cushions the blow. The entire rim of the wheel is preferably formed of sheet metal and is perforated by closely spaced laterally extending slots 25 which cross the grooves 21, 22, the metal about the grooves being turned inwardly, as at 25a to stiffen the rim and provide rounded edge ribs 26 for increasing traction while the slots 25 therebetween permit the escape of mud and snow or other loose material from between the band and the wheel. Normally, the band operates clear of all surfaces of the band except in the bottom and sides of the valley of the band so that the band bears only about the central circumferential ridge portion of the wheel.

For providing the track with great resistance to circumferential stretching at its sides and also to provide great lateral strength in the central portion of the band from one rib to the other, a pair of endless wire cable reinforcements 30, 31 are provided preferably of grommet construction, made by winding wire upon itself in full circle convolutions. These cable rings are built into the band in the region of the ribbed portions, and layers 32 of woven fabric or laterally extending cords are provided between the cables and are looped about the cables so as to anchor the cable in properly spaced-apart relation and resist spreading of the ribbed portions. The cables are preferably located with their centers of cross-section in alignment with or above the floor of the valley so as to increase the pressure of the rib faces against the wheel portion 20 when going around the wheel. Other layers 33 of fabric or cords may be arranged to extend from one margin of the track to the other on the tread side of the layers 32 to strengthen the track laterally against excessive flexure. Additional narrow plies 34 of fabric are arranged on the wheel side of the cables within the ribs of the track to provide greater solidity and strength, and some of these may be extended into the flat margins of the track to provide greater lateral resistance to tension and compression.

A layer 35 of vulcanized rubber or other rubber-like material is provided over the entire wheel face of the track and this may be of substantial thickness at the wheel contacting surfaces in the central valley of the track where it resiliently engages the sides and bottom of the wheel rib providing for strong traction and quiet driving of the track from the rib of the wheel.

Due to the action of the fabric reinforcement 32 in holding the cables in properly spaced relation, and the tendency of the ribs of the track to approach each other upon longitudinal bending of the track about the drive because of the inextensibility of the cables, and also due to the tensioning of the track acting to flex the marginal portions of the belt toward the wheel and thereby through cantilever action forcing the track ribs inwardly, lateral pressure on the rib of the track against the central rib of the wheel increases progressively from a position where the belt is tangential to the drive wheel to a position of greater curvature, while the resilient rubber material at the wheel face acts to provide accommodation to the wheel surface and increase the area of contact, thereby providing a good grip on the wheel.

The track however seats promptly on the wheel with the central ridge of the pulley on the bottom of the valley of the track, and driving friction is supplied principally by the tension of the track on the wheel. This differs from the prior V-belt practice wherein a belt of trapezoidal section seats in the pulley by wedging therein with an accompanying scuffing of the side driving faces of the belt that is avoided in the present construction.

The rubber covering is extended about the margins and over the tread face of the track to provide protection against moisture and to form a good wearing or tread surface layer 40 at the tread face. The tread layer may also be provided with cross ribs 41 or other raised traction lugs for securing increased traction on the ground.

The bogie wheels, which sustain the weight of the vehicle may be arranged side by side in pairs as in Fig. 4 where each bogie wheel is grooved to fit one rib of the track loosely for guiding purposes. The bogie wheels preferably contact a large part of the wheel face of the track including the margins of the track extending laterally beyond the ribs, but the sides of the grooves clear the ribs as seen in Fig. 4.

The tops of the ribs preferably clear the bogie wheels as shown but may contact the wheel for greater area of support. On the other hand, if desired, the track may contact the bogie wheels only at the top faces of the ribs, especially where the load is light.

In the modification of Fig. 5, the drive wheel and band are of the same construction as those shown in Figs. 2 to 4 except that the rubber-like material 35 at the side faces of the groove 13 is corrugated, as at 27 radially of the wheel and crosswise of the direction of band movement, to provide greater traction by cooperation with the ribs 26 of the wheel between the slots 25.

Use of the invention is not confined to belts for track laying type vehicles. Referring to Fig. 6, this shows an application to a power transmission belt wherein a pulley 50 having a central circumferential radially raised portion 51 with steeply inclined sides 52, 53 converging outwardly from the axis. The wheel also has cylindrical portions 54, 55 flanking the circumferential rib 51. The belt 56 has a central groove 57 in its wheel-engaging face, and this is defined by inwardly converging side walls 58, 59. The belt is reinforced longitudinally by substantially inextensible tension elements 60, 61 of cabled material preferably in endless grommet form, one at each side of the groove 57, and laterally by layers 62 of fabric or other textile material which extend about the cabled tension elements and hold them in properly spaced-apart relation against lateral separation. A covering 63 of rubber-like material encloses the reinforcements and provides a surface for engaging the pulley. The groove 57 receives the portion 51 of the wheel and the margins of the belt lateral to the groove preferably clear the surface of the wheel as indicated at 64 so that the ridge of the pulley seats on the bottom of the valley in the belt and the sides of the belt groove hug the sides of the pulley portion, thereby providing a good grip for driving purposes. As the tension elements 60, 61 are located laterally of the groove 57, tensioning of the belt causes the sides of the groove to move toward the sides of the circumferential raised portion of the pulley, thereby increasing the grip of the belt on the pulley. In this form of the invention, the sides of the belt groove 57 may be corrugated if desired as in the form of the invention of Fig. 5.

Variations may be made without departing from the scope of the invention as it is defined by the following claims.

I claim:

1. A band for power transmission comprising a flexible body of rubber-like material having at a wheel-contacting face a pair of laterally spaced-apart longitudinal ribs defining a valley flanked by generally radially disposed wheel-contacting surfaces for receiving a circumferential part of a wheel in close fitting engagement, said body having substantially flat marginal portions laterally beyond said longitudinal ribs, laterally spaced-apart substantially inextensible tension elements extending longitudinally of said band in the region of said longitudinal ribs, and means in said body interconnecting said elements and resisting lateral spreading of said elements, comprising laterally extending cords looped about said elements.

2. In a band power transmission assembly, a single flexible band comprising a body of rubber-like material having a broad wheel-contacting face of a shape to provide a pair of laterally spaced-apart and generally radially disposed inwardly converging wheel-contacting surfaces facing each other and separated by a valley for receiving a wheel part in lateral pressing relation with said surfaces, laterally spaced-apart substantially inextensible tension resisting elements extending longitudinally in the band in the region of each of said surfaces, and a wheel having a circumferential rib portion with outwardly converging side faces seating within said valley in frictional driving engagement with said surfaces, said wheel being in substantially non-driving relation with said band at all surfaces thereof other than in said valley.

3. In a band power transmission assembly, a single flexible band comprising a body of rubber-like material having a broad wheel-contacting face of a shape to provide a pair of laterally spaced-apart and generally radially disposed inwardly convergent wheel-contacting surfaces facing each other and separated by a valley for receiving a wheel part in lateral pressing relation with said surfaces, laterally spaced-apart substantially inextensible tension resisting elements extending longitudinally in the band in the region of each of said surfaces, means in said body interconnecting said elements and resisting lateral spreading of said elements, and a wheel having a circumferential rib portion seating within said valley with outwardly converging side faces in frictional driving engagement with said surfaces, said wheel being in substantially non-driving relation with said band at all surfaces thereof other than in said valley.

4. In a band power transmission assembly, a single flexible band comprising a body of rubber-like material having a broad wheel-contacting face of a shape to provide a pair of laterally spaced-apart and generally radially disposed inwardly convergent wheel-contacting surfaces facing each other and separated by a valley for receiving a wheel part in lateral pressing relation with said surfaces, laterally spaced-apart substantially inextensible cabled tension-resisting elements extending longitudinally in the band in the region of each of said surfaces, and a wheel having a circumferential rib portion seating within said valley with outwardly converging side faces in frictional driving engagement with said surfaces, said wheel being in substantially non-driving relation with said band at all surfaces thereof other than in said valley.

5. In a band power transmission assembly, a single flexible band comprising a body of rubber-like material having a broad wheel-contacting face of a shape to provide a pair of laterally spaced-apart and generally radially disposed wheel-contacting surfaces facing each other and separated by a valley portion for receiving a wheel part in close fitting relation with said surfaces, laterally spaced-apart substantially inextensible cabled tension-resisting elements extending longitudinally in the band in the region of each of said surfaces, means in said body interconnecting said elements and resisting lateral spreading of said elements, and a wheel having a circumferential portion seating within said valley portion in frictional driving engagement with said surfaces, said wheel being in substantially non-driving relation with said band at all surfaces thereof other than in said valley portion.

6. In a band power transmission assembly, a single flexible band comprising a body of rubber-like material having a broad wheel-contacting face of a shape to provide a pair of laterally spaced-apart and generally radially disposed wheel-contacting surfaces facing each other and separated by a valley portion for receiving a wheel part in close-fitting relation with said surfaces, laterally spaced apart substantially inextensible cabled tension-resisting elements extending longitudinally in the band, one at each side of said valley portion in the region of said surfaces, laterally extending tension elements reinforcing said body and connecting said cabled elements against lateral spreading, and a wheel having a circumferential portion seating within said valley portion in frictional driving relation with said surfaces, said wheel being in substantially non-driving relation with said band at all surfaces thereof other than in said valley portion.

7. A band for power transmission comprising a flexible body of rubber-like material having a wheel-contacting face of a shape to provide laterally spaced-apart and generally radially disposed wheel-contacting surfaces facing toward each other, laterally spaced-apart substantially inextensible tension-resisting elements extending longitudinally in the band in the region of said surfaces, and means in said body interconnecting said elements and resisting lateral displacement of said surfaces.

8. A band and pulley assembly comprising a pulley having a pair of axially spaced-apart circumferential side surfaces facing away from each other, and a band about said pulley, said band comprising a flexible body of rubber-like material having a recessed face to receive said pulley, the recessed face thereof comprising a pair of laterally spaced-apart drive surfaces facing toward each other to coact with said side surfaces of said pulley, a pair of substantially inextensible tension elements embedded in said body at positions laterally outward of said drive surfaces respectively, and flexible tension-resisting material joining said tension elements laterally of the band to compel said tension elements to urge said drive surfaces of the band toward each other and against said side surfaces of the pulley under the tendency of said tension elements to move inward radially of the pulley when tensioned thereon.

9. A power-transmission band comprising a flexible body of rubber-like material having a pair of laterally spaced-apart driving faces facing toward each other for receiving a pulley between them, a pair of substantially inextensible tension elements embedded in said body at positions laterally outward of said driving faces respectively, and flexible tension-resisting material joining said tension elements laterally of the band to compel said tension elements to urge said driving faces of the band toward each other under the tendency of said tension elements to move in the radially inward direction when tensioned about the pulley.

10. An endless band track comprising a flexible body of rubber-like material having a pair of laterally spaced-apart driving faces facing toward each other for receiving a pulley between them, said body having a load-carrying pulley-engaging surface between said driving faces, a pair of tension-resisting cables embedded in said body at positions laterally outward of said faces respectively, and fabric material extending in said body between and about said cables to resist separating movement of said cables and to urge said driving faces of the track toward each other under the tendency of said cables to move in the radially inward direction when tensioned about the pulley.

11. In a band power transmission assembly, a flexible band comprising a body of rubber-like material having a wheel-contacting face of a shape to provide a pair of laterally spaced-apart and generally radially disposed wheel-contacting surfaces facing toward each other with a valley between them for receiving a wheel part in close fitting relation with said surfaces, and a wheel having a circumferential portion seating within said valley with side surfaces facing away from each other in frictional engagement with the first said surfaces, said band comprising portions extending axially beyond said wheel-contacting surfaces thereof in radially spaced relation to said wheel and having longitudinal tension-resisting means in said portions, and means in said band resisting movement of said portions laterally apart to urge wheel-contacting surfaces toward each other and against said side surfaces of the wheel under the tendency of said portions to move in a radially inward direction when tensioned upon the wheel.

12. In a band power transmission assembly, a flexible band comprising a body of rubber-like material having a wheel-contacting face of a shape to provide a pair of ribs having laterally spaced-apart and generally radially disposed wheel-contacting surfaces facing toward each other with a valley between them for receiving a wheel part in close fitting relation with said surfaces, and a wheel having a circumferential rib seating within said valley with side surfaces of the rib facing away from each other in frictional engagement with the first said surfaces and with marginal portions extending from said rib, said band comprising marginal portions extending axially beyond said ribs thereof and said ribs and marginal portions of the band beyond said wheel-contacting surfaces thereof being in radially spaced relation to said marginal portions of said wheel and having longitudinal tension-resisting elements in said band at the ribs, and means in said bond interconnecting said tension-resisting elements and resisting movement of said ribs of the band laterally apart to urge said wheel-contacting surfaces toward each other and against said rib of the wheel under the tendency of said ribs of the band to move in a radially inward direction when tensioned upon the wheel.

13. In a band track and wheel assembly for a vehicle, a flexible band comprising a body of rubber-like material having a wheel-contacting face of a shape to provide a pair of laterally spaced-apart and generally radially disposed wheel contacting surfaces facing toward each other with a valley between them for receiving a wheel part in close fitting relation with said surfaces, a drive wheel having a circumferential portion seating within said valley with side surfaces facing away from each other in frictional engagement with the first said surfaces, said band comprising portions extending beyond said wheel contacting surfaces thereof in radially spaced relation to said drive wheel and having longitudinal tension-resisting means in said portions, and means in said band resisting movement of said portions laterally apart to urge said wheel-contacting surfaces toward each other and against side surfaces of the drive wheel under the tendency of said portions to move in a radially inward direction when tensioned upon the drive wheel, said portions extending beyond said wheel-contacting surfaces providing bogie wheel contacting surfaces for supporting a vericle therefrom.

14. A track for self-laying track type vehicles, said track comprising a band of rubber-like material having on the drive wheel engaging face thereof ribs defining a longitudinal wheel-engaging groove, longitudinally extending tension members embedded in said band at positions spaced inwardly of its margins, and means embedded in said band for transmitting force from said tension members to said ribs to increase lateral pressure on a driving wheel engaged in said groove.

15. An endless band track comprising a flexible body of resilient rubber-like material having a tread face and a wheel-engaging driving face opposite thereto, said body including substantially inextensible flexible tension-resisting elements extending longitudinally therein at its margins, and said track on its wheel-engaging driving face having laterally spaced apart ribs extending longitudinally of the track and presenting wheel-engaging side surfaces of said ribs of rubber-like material facing each other, means extending between said tension-resisting elements in said body to resist separating movement of said tension resisting elements and to urge said wheel-engaging side surfaces of said ribs toward each other under tendency of said tension-resisting elements to move in a direction radially of a wheel engaging said track when tensioned thereabout, said side surfaces having series of spaced apart wheel-contacting projections separated by spaces and extending cross-wise of the direction of travel of the track for increasing the grip of the wheel engaged by said surfaces.

16. An endless band track comprising a flexible body of rubber-like material having a pair of laterally spaced-apart driving faces facing toward each other for receiving a driving wheel between them, tension-resisting means embedded in said body at positions outward of said faces respectively, means in said body between said tension-resisting means to resist separating movement of said tension resisting means and to urge said driving faces of the track toward each other under tendency of said tension-resisting means to move in a direction radially of said driving wheel when tensioned thereabout, and said driving faces having series of spaced apart wheel-engaging projections separated by spaces and extending crosswise of the direction of travel of the track for increasing the grip of the driving wheel engaged by said surfaces.

17. A band power transmission assembly comprising a band of rubber-like material having a wheel contacting face of a shape providing a pair of laterally spaced apart wheel contacting surfaces facing each other to engage a circumferential rib of a wheel, and a wheel having a circumferential rib portion with outwardly inclined side faces in frictional driving engagement with said wheel-contacting surfaces of the band, said wheel-contacting surfaces having projections separated by spaces and extending cross-wise of the direction of travel of the band for increasing the grip of the wheel with said band, said band having inextensible tension members therein in the region of said side faces, and means in said band laterally connecting said tension members to prevent spreading of said band.

CHARLES O. SLEMMONS.

REFERENCES CITED

The following references are of record in the file of this patent:

UNITED STATES PATENTS

| Number | Name | Date |
|---|---|---|
| 1,400,100 | Reddaway | Dec. 13, 1921 |
| 1,501,097 | Chase | July 15, 1924 |
| 1,729,329 | Chilton | Sept. 24, 1929 |
| 1,792,921 | Newhouse | Feb. 17, 1931 |
| 2,107,013 | Morgan | Feb. 1, 1938 |

Certificate of Correction

Patent No. 2,494,065

January 10, 1950

CHARLES O. SLEMMONS

It is hereby certified that error appears in the printed specification of the above numbered patent requiring correction as follows:

Column 7, line 19, for the word "bond" read *band*;

and that the said Letters Patent should be read with this correction therein that the same may conform to the record of the case in the Patent Office.

Signed and sealed this 11th day of July, A. D. 1950.

[SEAL]

THOMAS F. MURPHY,
*Assistant Commissioner of Patents.*